US012306558B2

(12) United States Patent
Seemann et al.

(10) Patent No.: US 12,306,558 B2
(45) Date of Patent: May 20, 2025

(54) MIXING PRINTING FLUID

(71) Applicant: Hewlett-Packard Development Company, L.P., Spring, TX (US)

(72) Inventors: Ziv Seemann, Ness Ziona (IL); Yinon Harari, Ness Ziona (IL); Alexander Yekymov, Ness Ziona (IL); Shmuel Borenstain, Ness Ziona (IL)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 569 days.

(21) Appl. No.: 17/604,783

(22) PCT Filed: Jul. 31, 2019

(86) PCT No.: PCT/US2019/044467

§ 371 (c)(1),
(2) Date: Oct. 19, 2021

(87) PCT Pub. No.: WO2021/021186

PCT Pub. Date: Feb. 4, 2021

(65) Prior Publication Data

US 2022/0179336 A1 Jun. 9, 2022

(51) Int. Cl.

*G03G 15/00* (2006.01)
*B41J 2/18* (2006.01)
*G03G 15/08* (2006.01)

(52) U.S. Cl.

CPC ............ *G03G 15/0893* (2013.01); *B41J 2/18* (2013.01); *G03G 15/0889* (2013.01); *G03G 2215/0838* (2013.01)

(58) Field of Classification Search

CPC ........... G03G 15/0893; G03G 15/0889; G03G 2215/0838; B41J 2/18
See application file for complete search history.

(56) References Cited

U.S. PATENT DOCUMENTS

| | | | |
|---|---|---|---|
| 6,516,721 B1 | 2/2003 | Voge | |
| 8,845,083 B2 * | 9/2014 | Lucas | B41J 2/16541 347/92 |
| 2002/0122103 A1 | 9/2002 | Yamamoto et al. | |
| 2010/0053280 A1 | 3/2010 | Ohashi et al. | |
| 2012/0327145 A1 | 12/2012 | Pouzet | |
| 2014/0225965 A1 | 8/2014 | Heuft | |
| 2016/0082746 A1 | 3/2016 | De Saint Romain | |
| 2017/0246876 A1 * | 8/2017 | Michallon | B41J 2/17566 |

FOREIGN PATENT DOCUMENTS

| | | |
|---|---|---|
| DE | 102010061000 A1 | 6/2012 |
| JP | S61121943 A | 6/1986 |
| JP | 2004009685 A | 1/2004 |
| WO | WO-2011076810 A1 | 6/2011 |

* cited by examiner

*Primary Examiner* — Anshu Bhatia
(74) *Attorney, Agent, or Firm* — Jordan IP Law, LLC

(57) ABSTRACT

An example printing fluid apparatus, for a printing system, comprises a printing fluid reservoir to store printing fluid for use in a print job and a printing fluid channel to route printing fluid from the reservoir to the reservoir and to route printing fluid from a printing station of the printing system to the reservoir. The fluid channel comprises a port to introduce printing fluid from a printing fluid cartridge into the fluid channel such that the introduced printing fluid from the printing fluid cartridge at least partially mixes with printing fluid in the fluid channel.

15 Claims, 3 Drawing Sheets

290
218
222
205
204
250
223
215
203
208
217
214
202
206
213
221
216
210
211
215
221

201
200

MIXING PRINTING FLUID

BACKGROUND

Some printing systems store and mix printing fluid in a reservoir prior to routing the printing fluid to a printing station for printing an image to a substrate.

BRIEF DESCRIPTION OF DRAWINGS

Examples will now be described, by way of non-limiting example, with reference to the accompanying drawings, in which.

DETAILED DESCRIPTION

Figure 1:
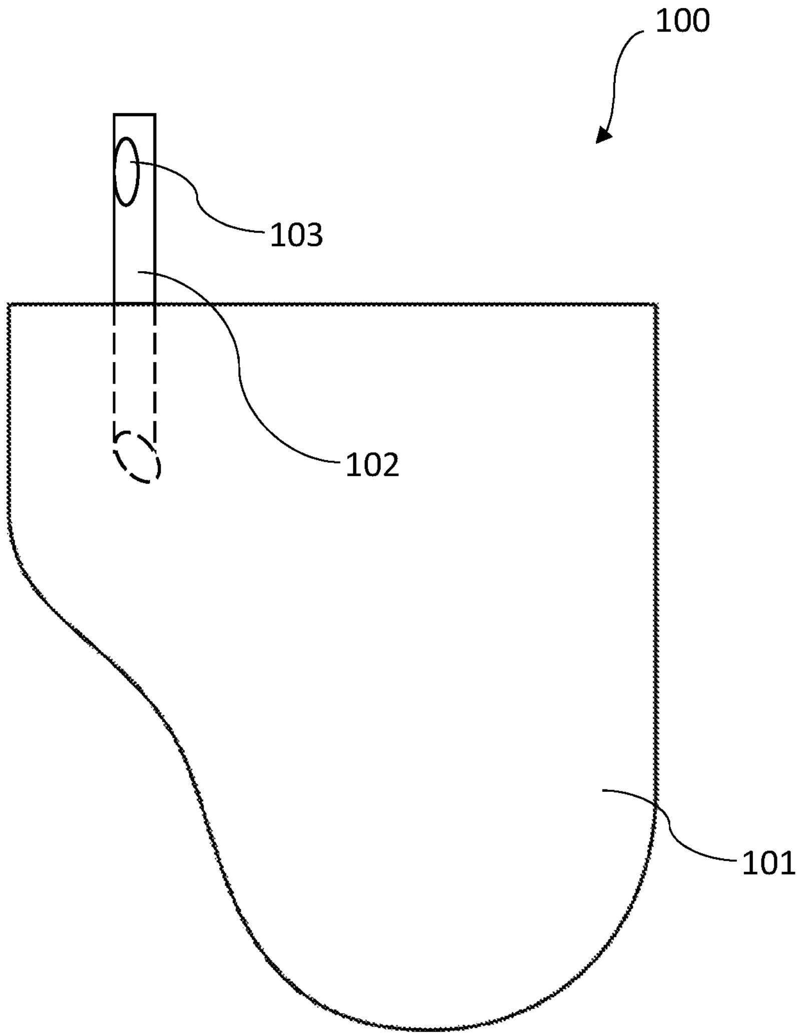
FIG. 1 is a simplified schematic of an example printing fluid apparatus.

In some printing systems, printing fluid (for example, an ink) is stored in a reservoir and routed to a printing station to be used in a print job. The printing fluid may comprise a homogenisation of printing fluid solids suspended in a carrier. For example, the printing fluid may comprise an ink, such as an electro-ink or an oil-based ink, and the carrier may comprise imaging oil. The printing station, that uses the printing fluid for a particular print job, may use the printing fluid to "ink" a substrate. For example, the printing station may comprise a photoconductive member having a latent, electrostatically charged, image formed thereon. A charging device may apply a uniform electrostatic charge to an outer surface of the photoconductive member and an imaging device may cause selective areas of the photoconductive member's surface to discharge or dissipate the charge. This may be done by exposing selected areas on the photoconductive member to light, e.g. by an imaging device. The discharged areas will form an electrostatic image which will correspond to a target image, or pattern, to be printed at the printing station. The printing station may comprise a binary ink developer assembly (or "BID") which may cause printing fluid to be transferred to the photoconductive member. For example, the BID may comprise a developer roller that is to receive printing fluid (e.g. the stored printing fluid in the reservoir) from the reservoir and, via rolling engagement, transfer at least a portion of the printing fluid to the photoconductive member. The BID may also comprise a squeegee roller to regulate the printing fluid thickness of the developer roller. The charge of the latent image of the photoconductive member causes printing fluid to adhere to this part of the photoconductive surface which effectively develops the latent image into a printing fluid image (sometimes referred to as a toner image). The BID may comprise an intermediate transfer member (ITM) which is to rollingly engage the photoconductive member, e.g. at a nip formed therebetween. Via this engagement, the printing fluid image is transferred to a print medium or substrate passing through an impression nip formed between the ITM roller and an impression cylinder.

Printing fluid may therefore be routed from the reservoir to the printing station but, as not all printing fluid will be used in the print job, printing fluid may be returned to the reservoir following the print job. This "excess" printing fluid may arise from, for example, the squeegee roller (e.g. excess printing fluid being removed from the developer roller by the squeeze roller to achieve the uniform printing fluid thickness), or may arise due to excess fluid being applied to the photoconductive member (since a portion of the fluid applied to the photoconductive member will adhere to the latent image). Any excess printing fluid may be returned to the reservoir from the printing station, and the amount of printing fluid in the reservoir will decrease with each print job (and be depreciated by around the amount of printing fluid that has been used at the printing station in the print job, e.g. to form the image).

As such, in some examples, "new" or "fresh" printing fluid is introduced into the reservoir (e.g. from a cartridge) to homogenise with the printing fluid contained therein so that the amount of printing fluid in the reservoir is enough to be used in an upcoming, or existing, print job. The introduced printing fluid should be at a concentration so that the resulting homogenisation in the reservoir has an acceptable proportion of printing fluid solids to ensure sufficient quality of a print job that uses the printing fluid (e.g. between 3%-8% concentration of printing fluid solids, in one example around 8% concentration of printing fluid solids), and so that the concentration of printing fluid solids is not so high so as to slow the flow of printing fluid through the system.

To replace printing fluid, some printing systems inject new printing fluid, e.g. from a cartridge, at a location near the bottom of the printing fluid reservoir and/or near an impeller blade whose function is to churn printing fluid in the reservoir. In these examples, it may be difficult to homogenise printing fluid that is injected too quickly, or printing fluid with a high proportion of printing fluid solids (since, generally speaking, the higher the concentration of solids within a printing fluid the more viscous the printing fluid). In these examples, printing fluid (which may initially be at a concentration of greater than 15% printing fluid solids, or, in one example, between approx. 15%-80% printing fluid solids, or, in another example, about and/or approximately 35% printing fluid solids—the remaining amounts being made up, at least partially, of printing fluid carrier, (for example, between 35% and 65% carrier) need to be diluted prior to being injected into the reservoir. For example, the printing fluid may need to be diluted to between 3% and 8% printing fluid solids prior to being injected at a low printing fluid flow rate into the reservoir to ensure that it can be homogenised with the fluid in the reservoir, to form a homogenisation suitable for printing (in one example 8% may be the maximum concentration of printing fluid solids in the injected printing fluid to ensure that the viscosity of the injected printing fluid is at an appropriate level for mixing). At this concentration and flow rate, however, some printing systems may struggle replacing the printing fluid (e.g. keeping the fluid levels in the reservoir enough) for print jobs requiring with high print coverages (for example, print jobs which may use a large proportion of substrate to be covered with printing fluid, such as printing a background to a substrate etc.). In these examples, there may be a reduction in print quality for such a high print coverage job if the volume of printing fluid in the reservoir is not sufficient.

Some examples herein relate to injecting printing fluid from a cartridge into the "flow tower" of a printing fluid apparatus, or printing fluid circuit (the "flow tower" in these examples being a general term for the piping, or conduit, that returns fluid to the reservoir—fluid that has bene circulated from the reservoir, of fluid returning from a printing station). More specifically, according to some examples herein, a printing fluid reservoir is connected to a conduit or fluid channel to route, introduce, or inject printing fluid back to the reservoir, the printing fluid being circulated printing fluid taken from the reservoir or printing fluid returning from a printing station (e.g. returning form part of a BID assembly). In other words, a return conduit returns circulated printing fluid and/or returning printing fluid from the developing unit back to the reservoir. Some examples herein relate to injecting printing fluid into the return conduit, since the velocity of the printing fluid and the turbulent flow of the printing fluid in the return conduit is, in these examples, sufficient to homogenise printing fluid with a high proportion of solids being injected at a high flow rate. In some examples herein, this point of injection allows printing fluid at a concentration of greater than 15% printing fluid solids (in one example, between approx. 15% and 80% printing fluid solids, and, in one example, 35% printing fluid solids) to be injected at a high flow rate into the return conduit. In an example the printing fluid solids are to be injected into the return conduit at a flow rate (e.g. a flow rate of printing fluid solids) greater than 0.5 grams per second (g/s). In another example the printing fluid solids are to be injected at a flow rate between 0.5 g/sec and 3 g/sec. In yet another example the printing fluids are to be injected at a rate between 1 g/sec and 2.5 g/sec. This flow rate may be the flow rate of printing fluid solids in the introduced and/or injected ink. As printing fluid in a cartridge may be at a concentration of greater than 15% (in one example, between approx. 15% and 80%, in another example, 35%, this means that the printing fluid does not need to be diluted prior to being injected into the system. Injecting printing fluid at this flow rate and concentration may also mean that the system may cope with high coverage print jobs. In other words, by their nature high coverage print jobs use a greater volume of printing fluid that low coverage print jobs and so, by injecting printing fluid at the high flow rate described above the system is able to ensure that a sufficient amount of printing fluid is available in the reservoir for such high coverage jobs, and that the fluid in the reservoir is homogenised. The injected printing fluid is therefore a mixture (e.g. a homogenisation) of printing fluid solids and, e.g. a carrier, but having a high concentration (e.g. greater than 15% or between 15% and 80% or approximately 35%) of printing fluid solids. The injected printing fluid therefore comprises a concentration of printing fluid solids that is higher than the concentration of printing fluid solids in the printing fluid in the reservoir and/or circulating through the printing fluid apparatus/system. In some examples herein, this new printing fluid of higher concentration is added into the system to homogenise with the printing fluid already present so that the resulting viscosity makes the printing fluid suitable for use in a print job. In some examples, the (new) printing fluid is injected into the return conduit at a location downstream of both a conduit returning printing fluid from the developing unit and a conduit returning printing fluid take from the reservoir back to the reservoir. The concentration of solids in the introduced or injected printing fluid may depend on the type of printing fluid, e.g. the composition thereof. For example, a given printing fluid to be introduced or injected may be at a concentration of greater than 15% printing fluid solids. In another example, a given printing fluid may be at a concentration of between 15% and 80% printing fluid solids. In yet another example, a given printing fluid may be at a concentration of 35% printing fluid solids.

Printing fluid may also be circulated to prepare printing fluid, maintain the consistency of existing printing fluid, ensure that the consistency of printing fluid in the reservoir is suitable for a print job (e.g. after the printing system has been idle) and/or so that printing fluid does not coagulate. To circulate the printing fluid, it may be routed from the reservoir back to the reservoir, e.g. via at least one fluid conduit. This may be done when printing fluid is not being routed to a print station for use in a print job. In other words, printing fluid may always be moving in the system, either being circulated back to the reservoir, or being routed to a print station for a print job, or from the print station to the reservoir (e.g. returning "unused" printing fluid to the reservoir). In some examples, printing fluid may be continually circulated even when printing fluid is routed to a printing station for use in a print job, and in other examples printing fluid may be circulated when a print job is not being performed.

FIG. 1 shows an example printing fluid apparatus 100 for a printing system (not shown in FIG. 1). The printing fluid apparatus 100 may comprise a printing fluid delivery system. The printing fluid apparatus 100 comprises a printing fluid reservoir 101 to store printing fluid (for example, ink) for use in a print job (e.g. a print job of the printing system). The printing fluid apparatus 100 comprises a printing fluid channel 102. The printing fluid channel 102 is to return printing fluid from the reservoir back to the reservoir and to return printing fluid from a printing station of the printing system. In this sense, the channel may be considered to be a return conduit. In other words, the printing fluid channel 102 is to receive printing fluid from the reservoir (for the purposes of clarity this will be referred to as "circulated printing fluid") and to receive printing fluid from a printing station, having been used in a print job (for the purposes of clarity this will be referred to as "returning printing fluid"). Therefore, the printing fluid channel is to return circulated printing fluid and returning printing fluid to the reservoir. At any stage during use, therefore, circulated printing fluid and/or returning printing fluid may be present in the fluid channel 102 for returning to the fluid reservoir 101.

Although not shown in FIG. 1 the fluid channel 102 in some examples may be fluidly connected to a port, inlet and/or conduit for circulated printing fluid, e.g. for introducing circulated printing fluid (e.g. from the reservoir) into the fluid channel 102. In some examples the fluid channel 102 may be fluidly connected to a port, inlet and/or conduit for returning printing fluid, e.g. for introducing returning printing fluid (e.g. from a printing station) into the fluid channel 102. In other words, the fluid channel 102 may be connected to a conduit for receiving circulated printing fluid and for introducing the circulating printing fluid into the channel 102 for returning to the reservoir, and the fluid channel 102 may be connected to a conduit for receiving returning printing fluid (e.g. from a printing station) for returning to the reservoir 102. As is shown in FIG. 1, the fluid channel 102 may be to return any and/or all printing fluid contained therein (e.g. circulated and/or returning printing fluid) to the reservoir 101. For this purpose, the fluid channel 102 may be directed, positioned and/or oriented so as to return any fluid contained therein to the reservoir 101. For example, the fluid channel 102 may be fluidly connected to the reservoir 101 such that an outlet of the fluid channel 102 is to introduce fluid to the reservoir 101. In one example the fluid channel 102 may be oriented such that fluid contained therein is introduced, or returned, to the reservoir 101 under the force of gravity. In other examples the fluid channel 102 may be differently oriented. The fluid channel 102 may comprise a fluid injection port, orifice or nozzle to inject and/or force fluid therein out of the fluid channel 102 (e.g. via a port, orifice, outlet, or nozzle thereof) and into the reservoir 101.

The velocity and/or turbulent flow of fluid present in the fluid channel 102 (which, as described above, may be fluid from a printing station and/or fluid being circulated from the reservoir) makes the printing fluid channel 102 suitable for mixing printing fluid from a printing fluid cartridge with the printing fluid present in the fluid channel 102. Accordingly, the printing fluid channel 102 comprises the port 103 which is to introduce printing fluid into the fluid channel such that the introduced printing fluid from the cartridge is at least partially mixed with the printing fluid in the fluid channel 102. Accordingly, therefore, mixing may comprise at least partially homogenising. In other words, the FIG. 1 example uses the velocity and turbulence in the fluid channel of printing fluid that is returning from the reservoir, or a print station, to introduce "new" printing fluid from a cartridge which will start mixing and/or start homogenising in the fluid channel 102 before being introduced into the reservoir 102 where it will continue to mix and/or homogenise. In this way the port 103 is to introduce printing fluid from a fluid cartridge at a concentration of greater than 15% (in one example, between approximately 15% and 80%, and, in another example, 35%) printing fluid solids (e.g. ink solids). The port 103 may be to introduce printing fluid from a fluid cartridge at a high printing fluid flow rate. In an example the printing fluid is to be injected into the fluid channel at a flow rate greater than 0.5 g/s. In another example the printing fluid is to be injected into the fluid channel at a rate between 0.5 g/s and 3 g/s. In yet another example the printing fluid is to be injected into the fluid channel at a rate between 1 g/s and 2.5 g/s. Despite being at a concentration of greater than 15% (or, in one example, between approx. 15% and 80%, or, in another example, 35%) solids, due to the turbulence and fluid velocity of the fluid in the fluid channel 102 the introduced printing fluid, from the cartridge, may at least partially mix and/or at least partially homogenise (e.g. start to mix and/or homogenise) with the printing fluid in the channel 102. As described above, the introduced printing fluid from the cartridge may comprise a homogenisation of printing fluid solids (e.g. greater than 15% or between 15% and 80%, or approximately 35% printing fluid solids) and e.g. a carrier such as an oil. The introduced printing fluid may therefore be of a higher concentration than the printing fluid already in the reservoir 101 (which may be at a concentration of between 3% and 8% printing fluid solids). In this way, high concentration printing fluid is added to the reservoir to increase the concentration of printing fluid in the reservoir 101 and therefore available for use in a print job. Injecting printing fluid at this (high) concentration at a high flow rate (as described above) may ensure that the viscosity of the homogenised printing fluid in the reservoir is sufficient for the printing fluid to be circulated in and through the printing fluid apparatus and suitable for use in a print job. Thereafter, the printing fluid being returned to the reservoir 101 by the flow channel 102 is a mixture (e.g. an at least partial homogenisation) of introduced printing fluid from the cartridge and circulated printing fluid and/or returning printing fluid. The fluid may continue to mix and/or homogenise in the reservoir 102, for example it may be moved by a mixer. To further use the turbulent fluid flow in the channel the printing fluid, port 103 may be positioned and/or located downstream in the fluid channel 102 relative to ports that are to introduce circulated and returning printing fluid, respectively.

The concentration of solids in the introduced or injected printing fluid may depend on the type of printing fluid, e.g. the composition thereof. For example, a given printing fluid to be introduced or injected may be at a concentration of greater than 15% printing fluid solids. In one example, a given printing fluid may be introduced or injected at a concentration of between 15% and 80% printing fluid solids. In another example, a given printing fluid may be at a concentration of 35% printing fluid solids. The concentration of printing fluid solids in the introduced or injected printing fluid may depend on the viscosity and/or thickness of the printing fluid present in the system (e.g. in the reservoir 101). For example, a less thick printing fluid may be added if the viscosity of printing fluid in the system is already determined to be high. This is due to the circulation of printing fluid becoming more difficult as the viscosity of the printing fluid increases.

The fluid reservoir 101 may comprise a blade or impeller that is to move, e.g. to churn, fluid in the reservoir. In this way the reservoir may be to mix printing fluid contained therein and may be to further mix and/or homogenise printing fluid that is introduced by the fluid channel 102. The fluid reservoir 101 may comprise a means to route printing fluid contained in the reservoir 101 to the printing station, for example a pump and/or conduit. The fluid reservoir 101 may comprise a means to route fluid contained in the reservoir 101 to the fluid channel 102, for example a pump and/or a conduit.

Figure 2:
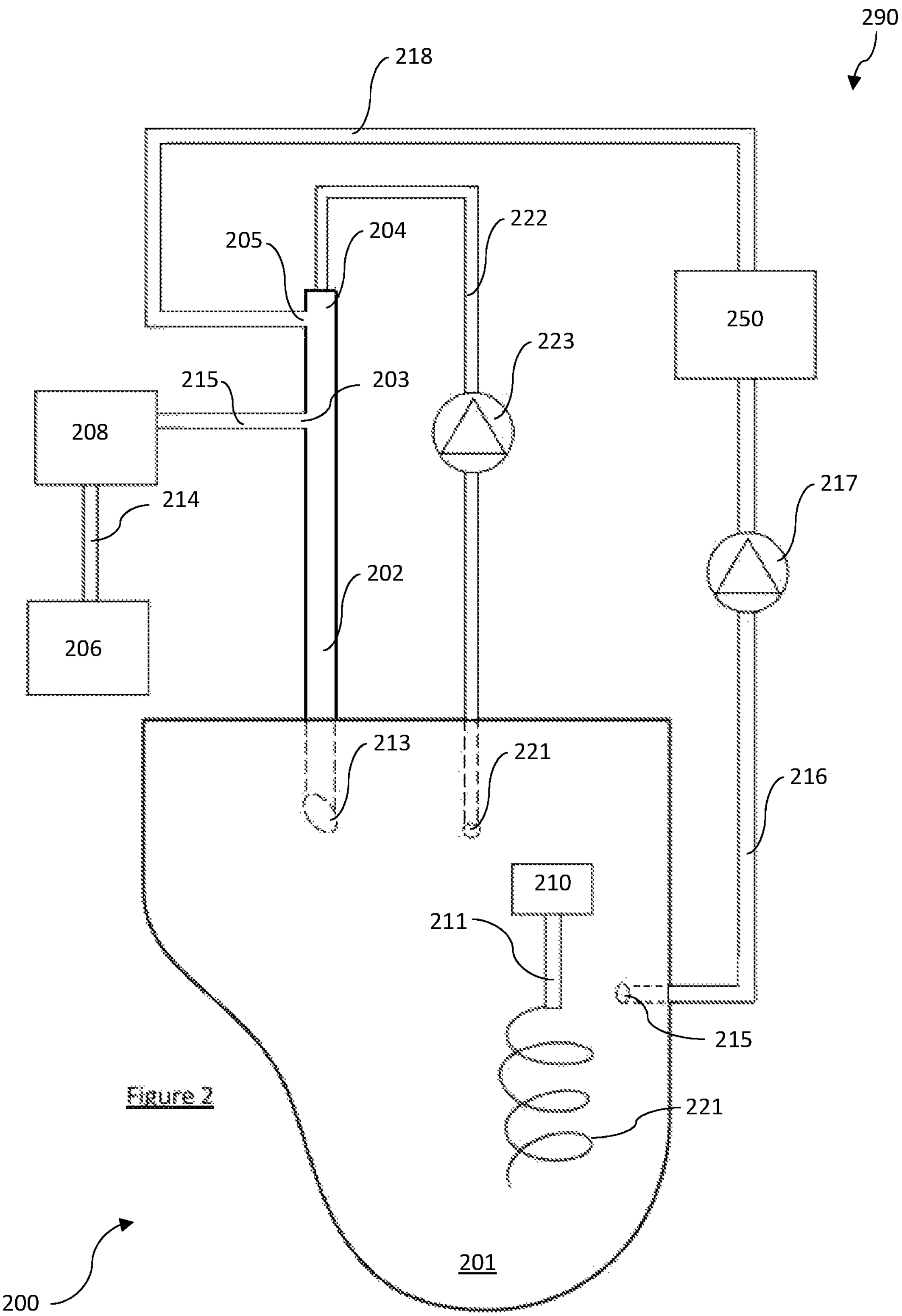
FIG. 2 is a simplified schematic of an example printing fluid apparatus.

FIG. 2 shows an example printing fluid system 290 and an example printing fluid apparatus 200 for the example printing system 290. The printing fluid apparatus 100 may comprise a printing fluid delivery system and may comprise the printing fluid apparatus 100 of the example of FIG. 1. The printing system 290 comprises a printing fluid station 250 at which a print job may be performed. The printing fluid station 250 may comprise a BID assembly, e.g. as described above, and therefore, the printing fluid station 250 may apply printing fluid to a photoconductive member for printing an image to a substrate.

The example printing fluid apparatus 200 comprises a printing fluid reservoir 201 to store printing fluid for use in a print job (e.g. at the printing station). The printing fluid apparatus 200 also comprises a printing fluid channel 202 to return printing fluid to the reservoir 201, for example as described above with reference to the printing fluid channel 102 of the example of FIG. 1. Specifically, and as will be explained below, the printing fluid channel 202 is to route printing fluid from the reservoir back to the reservoir (e.g. to return circulated printing fluid to the reservoir) and to route printing fluid from a printing station 250 to the reservoir (e.g. returning printing fluid). In other words, the printing fluid channel 202 is to route, direct, and/or return circulated printing fluid and/or returning printing fluid to the reservoir 201. As will be explained below, the printing fluid apparatus 200 comprises a port 203, for example as described above with reference to the port 103 of the example of FIG. 1. The printing fluid port 203 is to introduce printing fluid from a printing fluid cartridge 206 into the fluid channel 202 such that the introduced printing fluid from the cartridge 206 at least partially mixes with the printing fluid in the channel 202.

The reservoir 201, or tank, comprises an internal volume to hold a volume of printing fluid for storing and use in a print job. The apparatus 200 of this example comprises a motor 210 is operatively and movably connected to a shaft 211 and is to rotate the shaft 211. A blade or impeller 212 is connected to the shaft 211 such that rotation of the shaft 211 rotates the blade 212. When a volume of printing fluid is contained in the reservoir 201, operating the motor 210 to rotate the blade 212 will therefore move, or mix, the printing fluid in the reservoir 201. In this way, the moveable blade 212 may prevent coagulation of printing fluid in the reservoir. The blade 212 and/or shaft 211 and/or motor 210 may be considered a mixer to at least partially mix, e.g. churn, printing fluid in the reservoir.

The reservoir 201 in this example comprises a printing station port 215, for example an outlet of the reservoir, fluidly connected to a first printing station conduit 216 to route printing fluid from the reservoir 201 to the printing station 250. For this purpose, the apparatus 200 comprises a pump (e.g. a first pump) 217 in fluidic connection with the first printing station conduit 216 to create a suction pressure to draw printing fluid from the reservoir 201 and to direct printing fluid to the printing station 250 for use in a print job, e.g. as described above. A second printing station conduit 218 is connected, at a first end, to the printing station 250 and, at a second end, to the fluid channel 202 and is to direct or route printing fluid not used in the print job at the printing station 250 back to the reservoir 201 via the fluid channel 202.

The reservoir 201 also comprises a circulation port 221, for example an outlet of the reservoir, fluidly connected to a circulation conduit 222 to circulate printing fluid from the reservoir 201 back to the reservoir 201. For this purpose, the apparatus 200 comprises a pump 223 fluidly disposed in the circulation conduit 222 to draw printing fluid from the reservoir 201 and to direct printing fluid to the fluid channel 202. In this example, although two conduits are shown (circulation conduit 222 and first printing station conduit 216) each having a respective pump (223 and 217) in another example one pump may be provided. In this example, a single port (e.g. 221) and conduit (e.g. 222) are provided, the conduit being fluidly connected to a single pump, and after (e.g. downstream) of the pump there is provided a three-way valve, the three way valve being to direct fluid either for circulation (to the return conduit 202) or for a print job (to the printing station 250).

The fluid channel 202 comprises a second port 204 and a third port 205 (the port 203 being a first port), the second port 204 being to introduce printing fluid from the reservoir 201 to the fluid channel 202 and a third port 205 being to introduce printing fluid from the printing station 250 (via the conduit 218) to the fluid channel 202. The first fluid port 203 is located downstream, with respect to the direction of fluid flow, in the fluid channel 202 of the second and third ports, 204, 205. This configuration will mean that the printing fluid being introduced via the first fluid port 203 is introduced at a location such that printing fluid will be flowing in the channel 202 at a velocity sufficient for mixing at least partially with the printing fluid flowing in the channel 202.

The printing system 290 comprises a printing fluid cartridge 206 and a printing fluid adding module 208 (sometimes referred to as a solid add system). A conduit 214 fluidly connects the cartridge 206 to the adding module 208 and an injection conduit 215 fluidly connects the adding module 208 to the fluid channel 202. The adding module 208 is to receive printing fluid from the fluid cartridge 206 and to cause the fluid in the cartridge 206 to be introduced into the fluid channel 202 via the port 203. In some examples, the adding module 208 may be to dilute the printing fluid, for example, may be to reduce the concentration of printing fluid solids in the printing fluid. In other examples the adding module 208 may be to cause the printing fluid to enter the fluid channel 202 without dilution. The printing system 290 and/or the printing fluid apparatus 200 may comprise an injection nozzle. The module 208, conduit 215 and/or the port 203 may comprise the injection nozzle. In some examples the system 250 may not comprise the module 208 and the conduit 216 may directly connect the cartridge 206 to the port 203. In other word, printing fluid may be introduced or injected straight from the cartridge 206 to the flow channel 202.

The flow channel 202 may, as depicted in the example of FIG. 2, be oriented and/or positioned such that printing fluid in the flow channel 202 is introduced into the reservoir 201 under the force of gravity. This means that at least partially mixed and/or homogenised printing fluid can be introduced into the reservoir in an energy-efficient way, relying on gravity. The flow channel 202 comprises an outlet 213 to introduce printing fluid in the flow channel 202 into the reservoir 201. The outlet 213 may comprise an injection nozzle or may comprise an open end of the flow channel 202. As depicted in FIG. 2 the flow channel 202 may be positioned such that the outlet 213 is at a lower end of the flow channel 202 when the apparatus 200 is in use. In other examples the outlet 213 may be positioned at an upper end of the flow channel 202 in use. In this example the outlet 213 may comprise an injection nozzle so as to aid in printing fluid being expelled from the flow channel 202 into the reservoir. In other examples, the flow channel 202 may be positioned differently (e.g. positioned to extend sideways into the reservoir 201).

As explained above with reference to the example apparatus 100 of FIG. 1, the port 203 may be to introduce printing fluid from the cartridge 206 into the fluid channel 202 at a high flow rate. In another example, the module 208 may be to introduce printing fluid from the cartridge 206 into the conduit 215 and/or directly to the flow channel 202 at a high flow rate. In an example the printing fluid is to be injected at a flow rate greater than 0.5 g/s. In another example the printing fluid is to be injected at a rate between 0.5 g/s and 3 g/s. In yet another example the printing fluid is to be injected at a rate between 1 g/s and 2.5 g/s. The port 203 and/or the module 208 may be to introduce printing fluid into the channel 202 that has a concentration of greater than 15% (in one example, between approx. 15% and 80%, and, in another example, 35%) printing fluid solids. In this example, the printing fluid in the cartridge may be at a concentration of greater than 15% (in one example, between approx. 15% and 80%, and, in another example, 35%) printing fluid solids. As also described above, this injection location is suitable for mixing printing fluid at high (for example, greater than 15%, or between 15% and 80%, or approximately 35%) concentrations of solids, due to the turbulent flow of fluid (e.g. circulated and/or returned fluid) present in the fluid channel 202. The fluid channel is sometimes referred to as the "flow tower" of the apparatus and so the examples of FIGS. 1 and 2 are for injecting printing fluid from the cartridge into the flow tower of the apparatus. While this injection location is particularly suitable for higher concentration printing fluids it is also suitable for lower concentration printing fluids.

The apparatus 200 may comprise a liquid level sensor for the printing reservoir to measure and/or determine the level and/or a volume of printing fluid in the reservoir. In these examples, a controller may actuate the module 208 and/or an injection nozzle of the port 203 to cause printing fluid to be injected into the channel 202 when the level and/or volume of the printing fluid in the reservoir falls below a predetermined threshold. In this way, printing fluid may be replaced so that the levels in the reservoir are sufficient for an upcoming print job.

Figure 3:
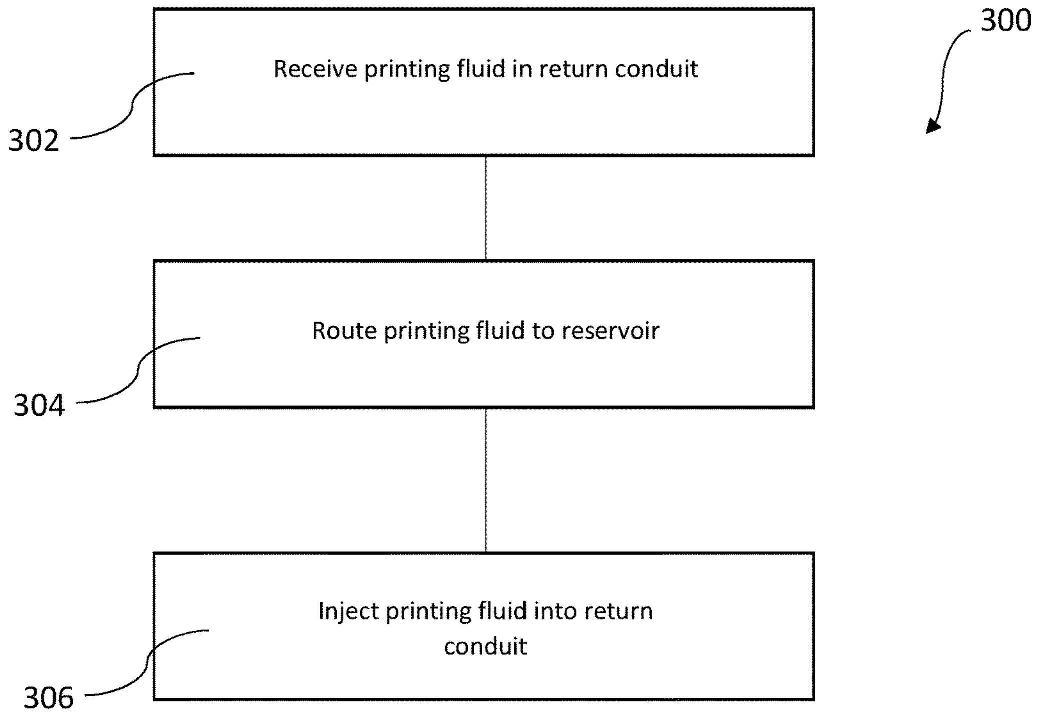
FIG. 3 is a flowchart of an example method.

FIG. 3 shows an example printing fluid circulation method 300. The method 300 may be a method of using the printing fluid apparatus 100 or 200 of the examples of FIGS. 1 and 2, respectively. The method 300 may be a method of injecting printing fluid (such as ink) from a print cartridge into a fluid system, or fluid apparatus. The method 300 may be a method of circulating printing fluid through a printing fluid delivery system. The method 300 may be a computer-implemented method and may be performed under the control of a controller and by virtue of at least one processor (e.g. a processor of a controller and/or a printing system).

The method 300 comprises, at block 302, receiving printing fluid from a printing fluid reservoir (such as the reservoir 101 or 201 as described above with reference to FIGS. 1 and 2) or from a printing station (such as station 250 as described above with reference to FIG. 2) in a return conduit. The return conduit may be to introduce or inject printing fluid therein into the reservoir. The return conduit may comprise the flow channel 102 or 202 as described above with reference to FIGS. 1 and 2. Block 302 may be performed by a processor and/or a controller that is to cause printing fluid to be circulated from the reservoir into the return conduit (e.g. by controlling the operation of a pump such as the pump 223 as described above with reference to FIG. 2) and/or to cause printing fluid to be directed from the printing station to the return conduit.

At block 304, the method comprises routing printing fluid in the return conduit to the reservoir. Block 304 of the method may comprise injecting, e.g. via an injection nozzle, for example under the control of a controller, printing fluid from the return conduit into the reservoir. Block 304 may comprise positioning the return conduit such that fluid in the return conduit is routed to the reservoir under the force of gravity.

At block 306, the method comprises injecting printing fluid, e.g. via an injection nozzle, for example under the control of a controller, from a printing fluid cartridge (e.g. cartridge 206) into the return conduit such that the injected printing fluid at least partially mixes with the printing fluid in the return conduit. Block 306 may be performed by a processor and/or a controller that is to cause printing fluid to be injected into the return conduit. For example, the controller and/or processor may be to cause an injection nozzle to inject printing fluid into the return conduit. In another example the controller and/or processor may be to cause a module (such as module 208) to inject printing fluid into the return conduit. At block 306, printing fluid may be injected into the return conduit in a continuous or pulse-wise manner, e.g. continuously or for discrete time intervals.

The method may further comprise routing the printing fluid in the return conduit, following block 306, into the reservoir. The method may also comprise mixing the printing fluid in the reservoir, e.g. by a rotating mixer blade or impeller. In other words, the method may comprise returning the least partially mixed printing fluid into the reservoir. For example, injected printing fluid may, at block 306, at least partially mix with printing fluid in the return conduit (circulated printing fluid and/or returning printing fluid as discussed above) and therefore the printing fluid in the return conduit may be an at least partial homogenisation of the injected printing fluid with circulated prating fluid (being circulated from the reservoir) and/or returning printing fluid (from a printing station). Therefore, the volume of printing fluid in the reservoir will increase as more printing fluid is added by the return conduit. In this way, the concentration of printing fluid in the reservoir may also be controlled.

Block 306 may comprise injecting printing fluid into the return conduit downstream of a location at which printing fluid from the reservoir and/or printing fluid from the printing station is received in the return conduit. This means that the location of injecting the printing fluid in the return conduit is such that circulated and/or returning printing fluid is already present in the return conduit, and therefore that the flow of circulated and/or returning printing fluid aids in mixing the new injected printing fluid. Block 306 may comprise injecting printing fluid into the return conduit at a high flow rate. This flow rate may aid in mixing the new injected printing fluid. The printing fluid, injected from the cartridge at block 306 of the method, may be at a concentration of greater than 15%, or between approx. 15% and 80%, or approximately 35% printing fluid solids. As printing fluid is injected, at block 306, into the return conduit, the turbulent flow of printing fluids therein (e.g. circulated and/or returning printing fluid) will start to mix the injected printing fluid with printing fluids present in the return conduit, even though the printing fluid is at a concentration of greater than 15%, or between approx. 15% and 80%, or approximately 35%.

Block 306 may be performed when it is determined, e.g. by a level sensor, that the volume of printing fluid in the reservoir has fallen below a predetermined, or pre-set, threshold. For example, a controller may determine that the printing fluid in the reservoir is less than a target amount to ensure that there is enough printing fluid present for use in a particular print job. In this example the controller may cause printing fluid to be injected into the return conduit, at block 306, so as to increase the printing fluid volume in the reservoir. In another example, the controller may be to cause printing fluid to be injected from the cartridge into the return conduit following a print job so as to automatically replace the printing fluid that was used in the print job. In this example the amount of printing fluid that is injected, at block 306, may be proportional to the amount of printing fluid that was used in the print job (which may be determined by a controller).

Figure 4:
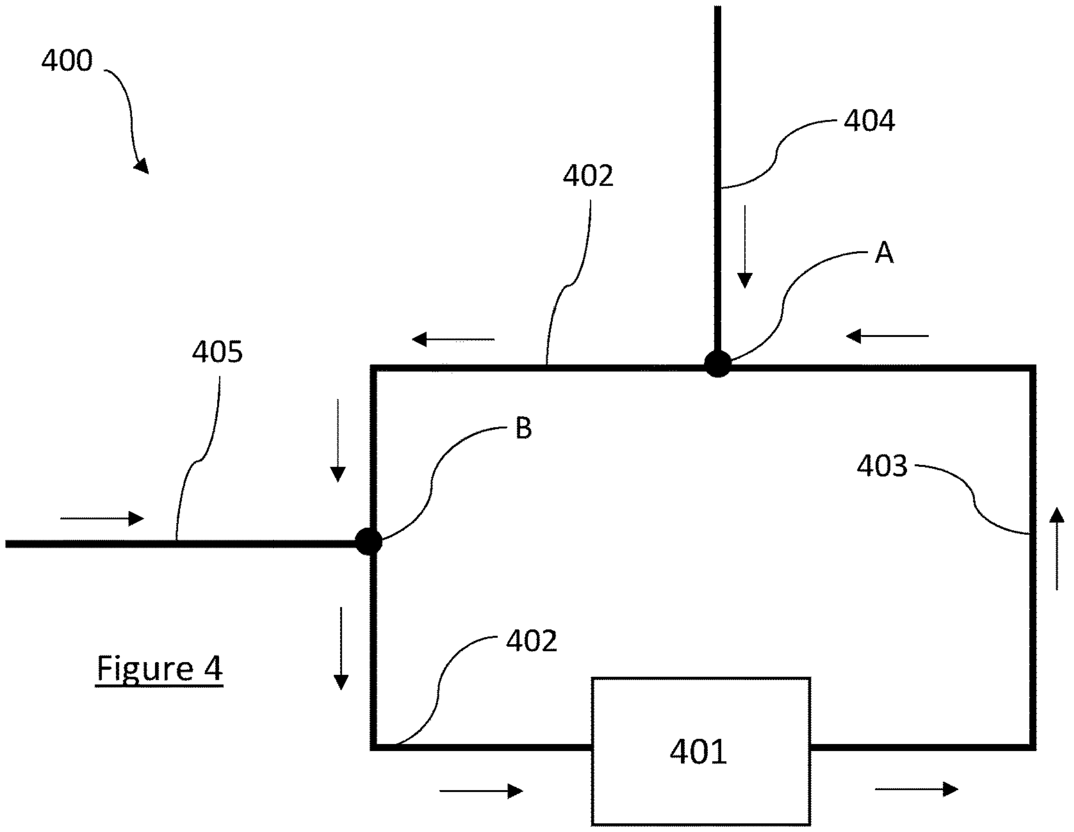
FIG. 4 is a simplified schematic of an example printing fluid circuit.

FIG. 4 shows an example printing fluid circuit 400, e.g. a fluid circuit. The printing fluid circuit 400 may be for use in the method 300 as described above with reference to FIG. 3 or the printing apparatus 100 or 200 as described above with reference to FIGS. 1 and 2, respectively. The printing fluid circuit 400 may be for use in a printing fluid apparatus, or printing fluid delivery system, to supply a print station (e.g. of a printing apparatus or printing system, such as the printing system 209 as described above with reference to FIG. 2) with printing fluid for use in a print job. Accordingly, the printing fluid circuit 400 may be for use in conjunction with the printing apparatus 200 to supply printing fluid to the printing station 250.

The printing fluid circuit 400 comprises a fluid tank 401 which is to hold or store printing fluid. The circuit 400 also comprises a return conduit 402, a circulation conduit 403, a printing station conduit 404, and a printing fluid injection conduit 405. The return conduit 402 is to introduce printing fluid into the fluid tank 401. The circulation conduit 403 is fluidly connected to the fluid tank 401 and to the return conduit 402 and is to direct fluid from the fluid take 401 to the return conduit 402 (e.g. towards and into the return conduit 402). The printing station conduit 404 is fluidly connected to the return conduit 402 and is to direct printing fluid from a (not shown) printing station to the return conduit 402 (e.g. towards and into the return conduit 402). The printing station conduit 404 is therefore fluidly connected, at one end, to the return conduit 402 and, at another end, to a printing station. The printing fluid in injection conduit 405 is fluidly connected to the return conduit 402 and is to inject (e.g. introduce, direct, and/or route) printing fluid from a (not shown) cartridge into the return conduit 402.

As schematically indicated in FIG. 4 the circulation conduit 403 meets the return conduit 402 at junction A, and the printing stating conduit 404 meets the return conduit 402 at the same junction. This is for illustrative purposes and, in other examples, the circulation conduit 403 may meet the return conduit 402 at a different junction than the printing station conduit 403. For example, the junction between the circulation conduit 403 and the return conduit 402 may be upstream, or downstream, of the junction between the printing station conduit 404 and the return conduit 402. At junction B the fluid injection conduit 405 meets the return conduit 402. The printing fluid injection conduit 405 is therefore located, or connected to the return conduit 402, downstream of the circulation conduit 403 and the printing station conduit 404. In other words, the junction between the injection conduit 405 and the return conduit 402 (junction B) is downstream of the junction between the circulation conduit 403 and the return conduit 402 and the junction between the printing station conduit 404 and the return conduit 402 (schematically indicated in FIG. 4 as junction A).

Junction B may comprise a port for introducing or injecting the printing fluid from the cartridge into the return conduit 402, for example port 103 or 203 as described above with reference to the apparatus 100 or 200. The port may comprise an injection nozzle for injecting the printing fluid into the return conduit 402. The printing fluid injection conduit 405 may be to inject printing fluid at a high flow rate of greater than 0.5 g/s, for example between 0.5 g/s and 3 g/s, for example between 1 and 2.5 g/s and/or at a concentration of greater than 15%, in one example between approx. 15% and 80%, in another example, 35%, printing fluid solids. As described above this means that the injecting printing fluid may at least partially mix and/or homogenise with other printing fluid prior to being introduced into the fluid tank 401.

The examples described herein may allow printing fluid (e.g. ink) to be injected into printing fluid delivery systems and/or circulation systems at a high flow rate and high concentration while maintaining effective homogenisation of printing fluid in a reservoir being stored for use in a print job. In this way, the examples described herein are capable of mixing printing fluid at the speeds and concentrations that can improve the homogeneity of printing fluid in the reservoir. This, in turn, allows high coverage jobs to be performed efficiently and effectively.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A printing fluid apparatus for a printing system, the printing fluid apparatus comprising:

a printing fluid reservoir to store printing fluid for use in a print job;

a printing fluid channel to route printing fluid from the reservoir to the reservoir and to route printing fluid from a printing station of the printing system to the reservoir, wherein the fluid channel comprises a port to introduce printing fluid from a printing fluid cartridge into the fluid channel such that the introduced printing fluid from the printing fluid cartridge at least partially mixes with printing fluid in the fluid channel before being introduced back to the reservoir.

2. A printing fluid apparatus as claimed in claim 1, wherein the port is a first port, and wherein the printing fluid channel comprises a second port to introduce fluid from the reservoir to the channel and a third port to introduce printing fluid from the printing station into the channel and wherein the first port is located downstream of the second and third ports.

3. A printing fluid apparatus as claimed in claim 1, wherein the port is to introduce printing fluid into the fluid channel at a flow rate of greater than 0.5 g/sec.

4. A printing fluid apparatus as claimed in claim 1, wherein the port is to introduce printing fluid having a concentration of greater than 15% printing fluid solids into the fluid channel.

5. A printing fluid apparatus as claimed in claim 1, wherein the printing station of the printing system comprises a developer unit.

6. A printing fluid apparatus as claimed in claim 1, wherein the printing fluid reservoir comprises a mixer to mix printing fluid in the reservoir.

7. A printing fluid circulation method comprising:

receiving printing fluid from a printing fluid reservoir or from a printing station in a return conduit;

routing printing fluid in the return conduit to the reservoir;

injecting printing fluid from a printing fluid cartridge into the return conduit such that the injected printing fluid at least partially mixes with the printing fluid in the return conduit before being introduced back to the printing fluid reservoir.

8. A printing fluid circulation method as claimed in claim 7, wherein printing fluid is injected into the return conduit downstream of where the printing fluid from the reservoir or from the printing station is received in the return conduit.

9. A printing fluid circulation method as claimed in claim 7, wherein printing fluid is injected into the return conduit at a flow rate of greater than 0.5 g/sec.

10. A printing fluid circulation method as claimed in claim 7, wherein the printing fluid injected into the return conduit comprises a concentration of greater than 15% printing fluid solids.

11. A printing fluid circulation method as claimed in claim 7, further comprising:

introducing printing fluid from the return conduit into the printing fluid reservoir; and mixing the printing fluid in the reservoir.

12. A printing fluid circuit comprising:

a fluid tank to hold printing fluid;

a return conduit to introduce printing fluid into the fluid tank;

a circulation conduit fluidly connected to the fluid tank and the return conduit to direct fluid from the fluid tank to the return conduit;

a printing station conduit fluidly connected to the return conduit to direct printing fluid form a printing station to the return conduit; and a printing fluid injection conduit fluidly connected to the return conduit to inject printing fluid from a printing fluid cartridge into the return conduit such that the injected printing fluid at least partially mixes with the printing fluid in the return conduit before being introduced back to the fluid tank.

13. A printing fluid circuit as claimed in claim 12, wherein the printing fluid injection conduit is connected to the return conduit downstream of the circulation conduit and the printing station conduit.

14. A printing fluid circuit as claimed in claim 12, wherein the printing fluid injection conduit is to inject printing fluid into the return conduit at a flow rate greater than 0.5 g/sec.

15. A printing fluid circuit as claimed in claim 12, wherein the printing fluid injection conduit is to inject printing fluid into the return conduit with a concentration of printing fluid solids that is greater than 15%.

* * * * *